United States Patent [19]

Sandi

[11] Patent Number: 4,863,040

[45] Date of Patent: Sep. 5, 1989

[54] APPARATUS FOR SEPARATING A CONTAMINATED PORTION OF BULK MATERIAL FROM A FLOW OF BULK MATERIAL

[75] Inventor: Roland Sandi, Meggen, Switzerland

[73] Assignee: Varicolor AG, Balzers, Liechtenstein

[21] Appl. No.: 136,655

[22] Filed: Dec. 22, 1987

[51] Int. Cl.[4] .......................... B07C 5/34; B07C 5/36; B65G 11/20

[52] U.S. Cl. ................................ 209/570; 193/31 A; 198/360; 209/655

[58] Field of Search ............... 209/567, 570, 571, 655; 193/31 R, 31 A; 198/360; 222/361, 531, 537

[56] References Cited

U.S. PATENT DOCUMENTS

| | | | |
|---|---|---|---|
| 760,772 | 5/1904 | Anderson et al. | 222/537 X |
| 3,283,899 | 11/1966 | Vedvik et al. | 209/567 X |
| 3,655,039 | 4/1972 | Kind et al. | 209/655 X |
| 4,171,262 | 10/1979 | Lattmann et al. | 209/570 X |
| 4,480,753 | 11/1984 | Thomas et al. | 209/570 X |
| 4,763,792 | 8/1988 | Kind | 209/570 |

FOREIGN PATENT DOCUMENTS

| | | | |
|---|---|---|---|
| 0143231 | 6/1985 | European Pat. Off. | 209/564 |
| 2032993 | 1/1972 | Fed. Rep. of Germany | 209/571 |
| 0145374 | 12/1980 | Fed. Rep. of Germany | 209/570 |
| 2944192 | 5/1981 | Fed. Rep. of Germany | 209/567 |
| 0574585 | 7/1924 | France | 209/571 |

*Primary Examiner*—Johnny D. Cherry
*Assistant Examiner*—Edward M. Wacyra
*Attorney, Agent, or Firm*—W. G. Fasse; D. H. Kane, Jr.

[57] ABSTRACT

Contaminated portions of bulk material are removed from a flow of bulk material with the aid of a flow or drop pipe in a casing that is movable back and forth between a discharge position and a normal flow position. The flow or drop pipe is equipped with baffle plates or bends for sufficiently retarding the free flow of the flowable bulk material to enable a detector and control mechanism to respond to the presence of contaminations and to then move the casing for the discharge of a contaminated portion of bulk material. The movement of the casing of the flow pipe assures that a slide gate or a portion of the casing closes the upper inlet to prevent the further flow of bulk material when the casing is in a discharge position. Due to the retardation of the free flow of the bulk material, it is possible to construct the apparatus with a substantially shorter structural height than was possible heretofore.

4 Claims, 3 Drawing Sheets

APPARATUS FOR SEPARATING A CONTAMINATED PORTION OF BULK MATERIAL FROM A FLOW OF BULK MATERIAL

FIELD OF THE INVENTION

The invention relates to an apparatus for separating a contaminated portion of bulk material from a flow of flowable bulk material. The contaminations may include particularly metal particles which do not contaminate the entire bulk material, but only a portion or portions. The removal is to be accomplished while the flowable bulk material travels through a movable bulk material flow pipe, also referred to as a drop pipe arranged for cooperation with a sensor or detector for the contaminations. An output signal from the detector controls a drive for moving the drop pipe.

DESCRIPTION OF THE PRIOR ART

Flowable products, such as granular synthetic material used for injection molding purposes, may contain undesirable contaminations, especially metallic contaminations which can cause substantial damage to the production machinery, thereby leading to undesirable and costly shut-downs.

In order to avoid the foregoing problems, there are metal separating devices available in the art which use detectors operating with inductive or magnetic means for the sensing of the contaminations. These sensors provide a signal in response to the presence of metallic contaminations in a bulk material flow travelling freely downwardly in a drop chute or the like. The detector controls the movement of a flap hinged in position below the drop chute. It is also known to provide a flexible drop pipe or chute which is moved from a normal position into a discharge position in response to control signal from the sensor or detector.

Since the sensing of the presence of a contamination and the removal of the contaminated portion must take place during the free fall motion of the flowable bulk material in the drop chute or pipe, a substantial vertical spacing is required between the detector and the discharge mechanism for the contaminated material in order to obtain sufficient time for the proper removal of the contaminated material. Such time is required due to the electrical and mechanical response characteristics which involve a certain delay between the sensing and the subsequent material removal. The mentioned spacing in turn results in a substantial structural height of conventional devices so that their use in connection with production machinery such as injection molding machines is restricted having regard to the available space or rather height of the room in which the machinery is to be installed. Further, the above mentioned conventional separators cannot be used in connection with devices in which a column of bulk material is stationary, except when a portion of bulk material slides down in response to the use of a respective portion.

OBJECTS OF THE INVENTION

In view of the foregoing it is the aim of the invention to achieve the following objects singly or in combination:

- to provide an apparatus of the type described above which is improved in that it has a substantially smaller structural height without impairing its ability to function for the intended purpose;
- to construct such a separator short enough in the vertical direction that it may be directly mounted on top of a production machine, for example, an injection molding automat; and
- to use detectors capable of sensing the presence of contaminations other than metal parts, such as glass, rocks, or the like.

SUMMARY OF THE INVENTION

The apparatus of the invention is characterized in that flow retarding means such as baffle plates or flow direction changing elements are installed in the flow or drop pipe for the flowable bulk material. The drive member is connected with the flow or drop pipe for moving the flow or drop pipe from a normal position to a contamination discharge position and back again in response to a detector control signal. Additionally, means are provided which close the inlet of the apparatus into the drop or flow pipe when the latter is in the contamination discharge position. The closure means are located above the baffle plates or deflection members.

The invention makes sure that the free fall of the flowable bulk material is retarded after the bulk material has passed through the contamination detector. Thus, the structural height of such an apparatus can be surprisingly reduced as compared to devices of the prior art.

Another advantage of the invention is seen in that the present apparatus can even be used in connection with stationary flowable bulk material columns because during the discharge of a contaminated portion, material cannot pass into a space behind the closure member, for example, in the form of a slide gate to thereby impede the return movement of the slide gate.

BRIEF DESCRIPTION OF THE DRAWINGS

In order that the invention may be clearly understood, it will now be described, by way of example, with reference to the accompanying drawings, wherein.

Figure 1:
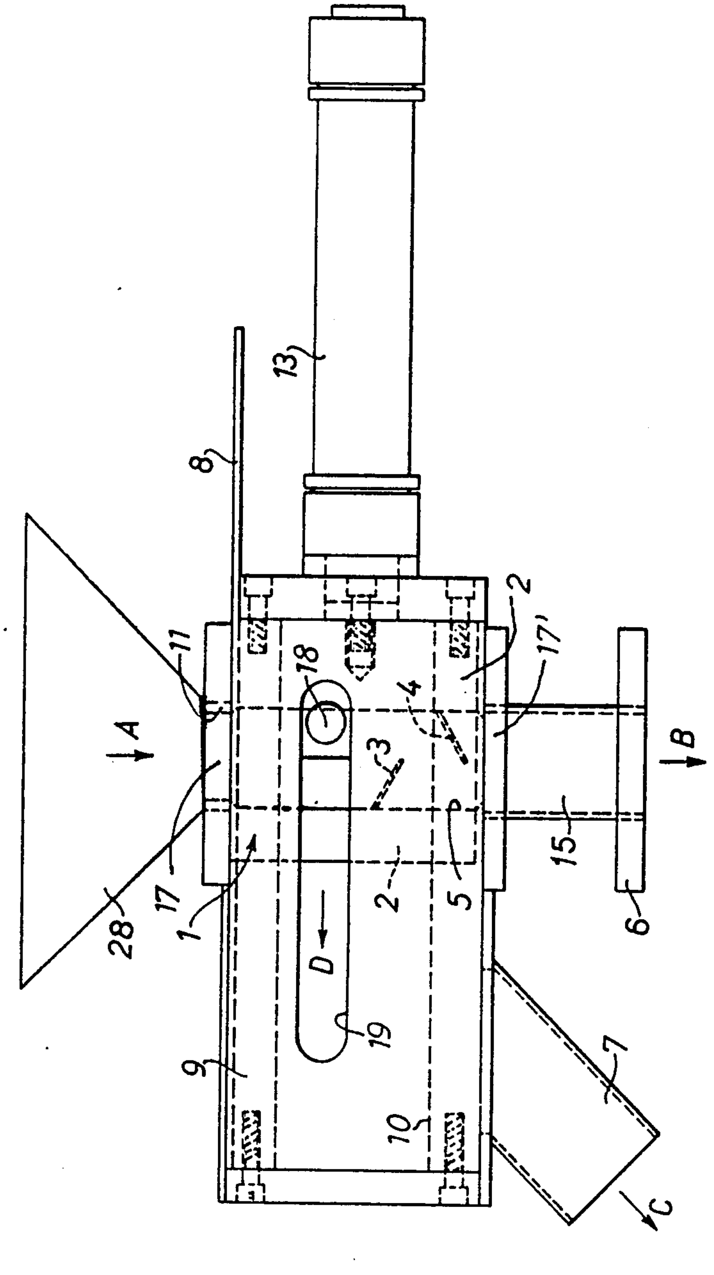
FIG. 1 is a somewhat schematic side view of the apparatus according to the invention.

DETAILED DESCRIPTION OF PREFERRED EXAMPLE EMBODIMENTS AND OF THE BEST MODE OF THE INVENTION

The present apparatus separates contaminated portions of flowable bulk material from the flow of such bulk material. Especially magnetic and non-magnetic metal particles are detected and that portion containing these particles is removed. For this purpose the separating mechanism 1 comprises a flow or drop pipe section 2 in the form of a block or casing having a passage 2' therethrough. The casing 2 is arranged in a housing 9 having an inlet 17 connected to a funnel or hopper 28 for introducing the flowable bulk material as indicated by the arrow A. The housing 9 has two outlets 17' and 7. The outlet 17' registers with the inlet 17 through the flow or drop passage 2′ for discharging uncontaminated bulk material in the direction of the arrow B. The second outlet 7 is located to the left of the first outlet 17′ and serves for discharging contaminated bulk material in the direction of the arrow C when the casing 2 and thus the flow or drop passage 2′ has been moved in the direction of the arrow D to the left in FIG. 1, as will be described below.

Figure 2:
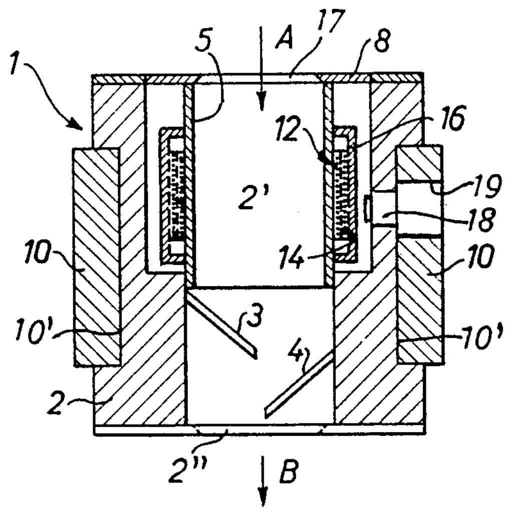
FIG. 2 is a sectional view through the movable flow or drop pipe according to the invention using baffle plates for retarding the free fall of the bulk material.
Figure 4:
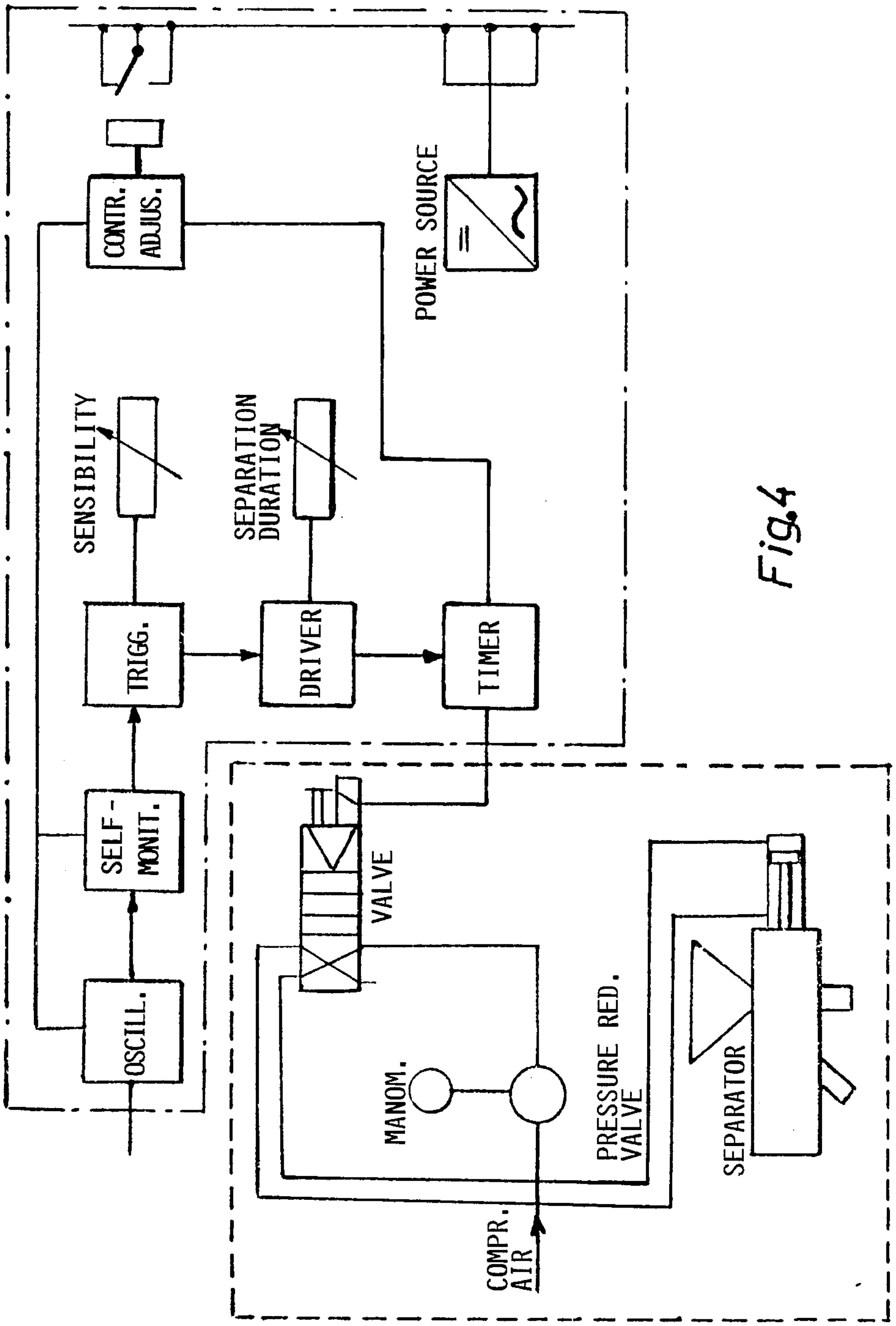
FIG. 4 is a block diagram illustrating the control mechanism for the movement of the flow pipe back and forth between its normal position and its contamination discharge position.

The casing 2 contains a sensor or detector 12, baffle plates 3 and 4 which are slanted relative to the vertical flow direction, drive means such as a piston cylinder device 13, and an electronic signal processing and evaluating circuit shown in block form in FIG. 4 for providing a control signal for the piston cylinder device 13 in response to the detection of a contamination passing through the detector 12. The housing 9 comprises two guide rails 10 on which the casing 2 is slidably mounted for a horizontal back and forth movement. Thus, the guide rails 10 engage guide grooves 10′ in the casing 2 as best seen in FIG. 2. The piston cylinder device 13 may be operated pneumatically or hydraulically through a respective source of pressure not shown. The supply of fluid under pressure to one or the other end of the piston cylinder device 13 is controlled by an electromagnetic valve shown in FIG. 4. A ring or collar 11, for example of synthetic material, surrounds the lower end of the funnel 28 to properly guide flowable bulk material into a drop pipe 5 in the casing 2 surrounded by the detector 12. The drop pipe 5 extends vertically and forms part of the flow passage 2′, the latter extending entirely through the casing 2. A vertical pipe section 15 is connected to the first outlet 17′ and may serve to store a portion of bulk material that has passed through the flow or drop passage 2′. The lower end of the pipe section 15 may be directly connected to a production machine, not shown, for example, by means of a flange 6.

The lower open end 2″ of the casing 2 will come to register with the second outlet 7 when the piston cylinder device 13 has moved the casing 2 into the left-hand position in the housing 9 of FIG. 1. In order to stop the further flow of material when the casing 2 is in the left-hand position in FIG. 1, a slide gate member 8 is connected to move with the casing 2 to thereby close the lower end of the funnel 18 or inlet 17. The slide member 8 is so dimensioned that it properly closes the inlet 17 when the casing is in the left-hand position, but opens the inlet when the casing 2 is in the right-hand position as shown in FIG. 1.

FIG. 2 shows the separating apparatus 1 in more detail. The right-hand guide rail 10 of the housing 9 is provided with an elongated slot 19 also seen in FIG. 1 for the insertion of an electrical conductor cable into a plug-in socket 18 for connecting the detector 12 with its sensor coils 14 to the circuit of FIG. 4. A flexible cable is used so that the cable may move back and forth with the casing 2. The baffle plates 3 and 4 are vertically spaced from each other and arranged approximately diametrically opposite each other with a slant relative to the vertical flow direction of the bulk material. The plates 3 and 4 slant in opposite directions downwardly just sufficient so as to retard the flow of material for a time of sufficient duration for compensating any response delays. Preferably, the lower ends of the baffle plates slightly overlap each other to prevent a free fall of bulk material. Thus, the bulk material first impinges on the baffle plate 3 and then on the baffle plate 4.

The detector 12 comprises, for example, induction coils 14 surrounding on the one hand the drop or flow pipe 5 and surrounded on the other hand by an electrical and magnetic screen 16. The coil 14 comprises a coupling coil section and an oscillating circuit coil section connected to the circuit shown in FIG. 4. The screen 16 may be provided in the form of a focussing ring. Metallic particles travelling through the flow or drop pipe 5 cause a change in the output voltage of the coil portion forming part of the oscillating circuit. As a result, the oscillator output voltage is also changed and the output signal passes through a differentiating circuit and through an amplifier circuit including a threshold compensating circuit component for evaluating the signal and thereby controlling a relay. The relay in turn activates the control valve for the drive piston cylinder device 13. Thus, the detector, or rather its coils 14, are so arranged that the metallic particles passing through the high frequency vibration field of these coils control the above mentioned relay through the control circuit of FIG. 4 to thereby admit fluid under pressure to the right-hand end of the cylinder, thereby driving a piston and piston rod to the left for moving the casing 2 into the left-hand position in the direction of the arrow D shown in FIG. 1.

The circuit of FIG. 4 produces, after an adjustable time delay, a signal for admitting fluid under pressure to the left-hand end of the cylinder 13 to thereby move the casing 2 back into the right-hand position, thereby opening the slide gate 8 again. As long as there are no contaminations in the flowing bulk material, the piston cylinder device 13 will tend to hold the casing 2 in the normal or right-hand position of FIG. 1. Thus, the material will flow in the direction of the arrow B to any machine that uses the material, for example an injection molding machine.

As mentioned above, as long as the casing 2 is in the left-hand position the slide gate 8 closes the hopper 28. However, if the casing 2 should have a sufficiently large dimension, the gate 8 might not be necessary, because then the upper side of the casing 2 may close the hopper 28.

The pipe section 15 is secured to the housing 9 and hence stationary. It may collect any bulk material that might still fall down prior to the complete closing of the inlet 17 by the gate 8.

Figure 3:
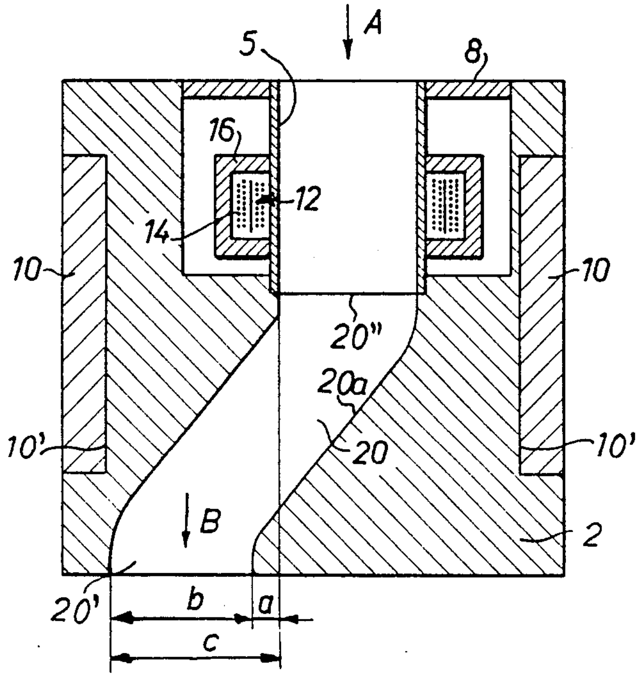
FIG. 3 is a sectional view similar to that of FIG. 2, but showing a modified flow pipe with a knee pipe section for retarding the material flow.

FIG. 3 shows a modified embodiment in which the baffle plates 3 and 4 have been replaced by a knee pipe section 20 forming a slanted channel which is slanted to such an extent that its lower outlet 20′ is horizontally displaced relative to its upper inlet 22′. The slanted pipe section 20 has a diameter "b" and the horizontal displacement "c" is at least as large as the diameter "b". Preferably, the displacement "c" is larger than the diameter "b" by a spacing "a" as best seen in FIG. 3 to make sure that flowing bulk material must always impinge on the lower wall portion 20a of the slanted knee pipe section 20. The embodiment of FIG. 3 functions in the same manner as the embodiment of FIG. 2. The elongated slot 19 and the plug-in socket 18 is not shown in FIG. 3 for simplicity's sake. However, the embodiment of FIG. 3 also has such a plug-in socket 18′ for the connection to a flexible electrical conductor cable.

Rather than using a hydraulic or pneumatic piston cylinder device 13, it is conceivable to use an electromagnetic solenoid with a high response characteristic for moving the casing 2 back and forth to minimize the delay times. It is also possible to move the casing 2 around a vertical axis in a rotational movement rather than in the described linear movement.

It is also possible to use more than two baffle plates depending on the retardation of the free flow that is required for any particular type of material. Similarly, the knee pipe section 20 could have several bends rather than only two.

The type of detector will depend on the type of material to be removed. For example, a detector could be used that responds to density differences between the contaminating material and the flowable bulk material. Thus, other materials could be removed, not only metal, such as glass, rocks, or the like.

FIG. 4 shows a block diagram illustrating the control mechanism for the movement of the flow pipe between its normal position and its contamination discharge position. An oscillator is connected with a self-monitoring device, a trigger, a driver, and a timer. The sensibility for discharging can be adjusted by a sensibility device. To adjust the separation duration a device is connected with the timer. The timer is connected with an electro-pneumatic valve. This valve has a first position for the flow forth of the cylinder device 13 and a second position for the flow back of the cylinder device 13. Controlling of the valve is effected by a control adjusting device. Compressed air is regulated by a pressure regulator valve and pressure can be inspected by a manometer. A pipeline connects the pressure regulator valve with the electro-pneumatic valve. The cylinder device and the electro-pneumatic valve are connected by two pipelines for the movement of the piston and therewith the flow pipe forth and back.

Although the invention has been described with reference to specific example embodiments, it will be appreciated, that it is intended to cover all modifications and equivalents within the scope of the appended claims.

What I claim is:

1. An apparatus for separating a contaminated portion of bulk material from a flow of flowable bulk material, comprising a housing having an inlet and first and second outlets, a casing (2) movably arranged in said housing, flow pipe means arranged substantially vertically in said casing and forming part of a flow passage for normally passing uncontaminated bulk material from said inlet to one of said outlets when said flow pipe means interconnect said inlet with said one outlet, drive means connected to said casing (2) for moving said flow pipe means between a normal position in which said flow pipe means can discharge uncontaminated bulk material through said one outlet and a further position in which said flow pipe means can discharge contaminated bulk material through the other of said outlets, metal detector means arranged for cooperation with said flow pipe means for providing a drive control signal in response to the presence of any metal in said bulk material flowing through said flow pipe means, said flow pipe means being surrounded by said metal detector means and operatively connected with said casing (2), said drive means comprising a piston cylinder drive member operatively connected to said movable casing (2), electronic control means connected to receive said drive control signal for controlling the operation of said piston cylinder drive member in response to said drive control signal, said housing comprising guide means for guiding said casing together with said flow pipe means and said metal detector means when said casing is driven by said drive means between said normal position and said further position, a pipe section (15) for storing a quantity of bulk material in said pipe section, said pipe section (15) being connected below said casing (2) for communicating with said flow pipe means through said one outlet when said flow pipe means are in said normal position, means located in said flow pipe means below said metal detector means for slowing down a flow of bulk material through said flow pipe means so that said metal detector means and said drive means can become effective if any metal is present in said bulk material passing through said flow pipe means, and gate means (8) connected to said casing to move with the casing for closing said inlet in said housing when said flow pipe means with its casing is in said further position and for discharging a contaminated portion of bulk material through said other outlet.

2. The apparatus of claim 1, wherein said slowing down means comprise at least two baffle plates arranged diametrically opposite each other and with a spacing from each other in said flow pipe means of said movable casing, said baffle plates slanting in opposite directions at an angle relative to a vertical fall direction of said bulk material, one of said baffle plates being located at a higher level than the other baffle plate.

3. The apparatus of claim 1, wherein said slowing down means for said bulk material comprise a knee pipe section in said casing having a slanted pipe channel including an inlet end and an outlet end, said slanted pipe channel having such a slant that said inlet end and said outlet end are horizontally displaced relative to each other sufficiently so as not to register with each other, said knee pipe section having a given diameter (b), wherein said outlet end is horizontally displaced relative to said inlet end by a displacement (c) which is larger than said given diameter (b) of said pipe section.

4. The apparatus of claim 1, wherein said housing comprises linear guide rails engaged by guide grooves of said casing when said drive means move said casing.

* * * * *